US011816749B1

(12) United States Patent
Foote et al.

(10) Patent No.: US 11,816,749 B1
(45) Date of Patent: Nov. 14, 2023

(54) ESTATE PLANNING AND BENEFICIARY MANAGEMENT SYSTEM INCLUDING DIGITAL ASSETS

(71) Applicant: Legacy Suite Inc, Lithonia, GA (US)

(72) Inventors: Sean Foote, Lithonia, GA (US); Azaz Ahmed, Lahore (PK)

(73) Assignee: Legacy Suite Inc, Lithonia, GA (US)

( * ) Notice: Subject to any disclaimer, the term of this patent is extended or adjusted under 35 U.S.C. 154(b) by 0 days.

(21) Appl. No.: 18/178,591

(22) Filed: Mar. 6, 2023

Related U.S. Application Data

(63) Continuation-in-part of application No. 17/854,366, filed on Jun. 30, 2022, now Pat. No. 11,599,961.

(51) Int. Cl.
*G06Q 20/00* (2012.01)
*G06Q 50/18* (2012.01)
*G06Q 20/36* (2012.01)
*G06Q 20/06* (2012.01)

(52) U.S. Cl.
CPC ....... *G06Q 50/186* (2013.01); *G06Q 20/0658* (2013.01); *G06Q 20/36* (2013.01); *G06Q 2220/00* (2013.01)

(58) Field of Classification Search
CPC .. G06Q 50/186; G06Q 20/0658; G06Q 20/36; G06Q 2220/00
See application file for complete search history.

(56) References Cited

U.S. PATENT DOCUMENTS

2021/0056541 A1* 2/2021 Kim .................. G06Q 20/3276

* cited by examiner

*Primary Examiner* — Dante Ravetti
(74) *Attorney, Agent, or Firm* — Kenyon Jenckes

(57) ABSTRACT

A estate planning and beneficiary management system according to an embodiment includes a system controller which may prompt and receive from a user information which may be necessary to create and estate planning model. The system may provide for traditional assets and digital assets, such as cryptocurrency and NFTs. The system may provide for distribution of the digital assets using smart contracts and blockchain wallets. The system may provide access by beneficiaries and trusted contacts to the user selected documents at different user defined permission levels. Upon the user's death, the system may automatically notify the beneficiaries and trusted contacts, execute block transactions between the user's wallets and beneficiaries' wallets according to the smart contracts, and notify outside world platforms of the user's death and the user's directives for the particular platforms as laid out in the user's will.

2 Claims, 16 Drawing Sheets

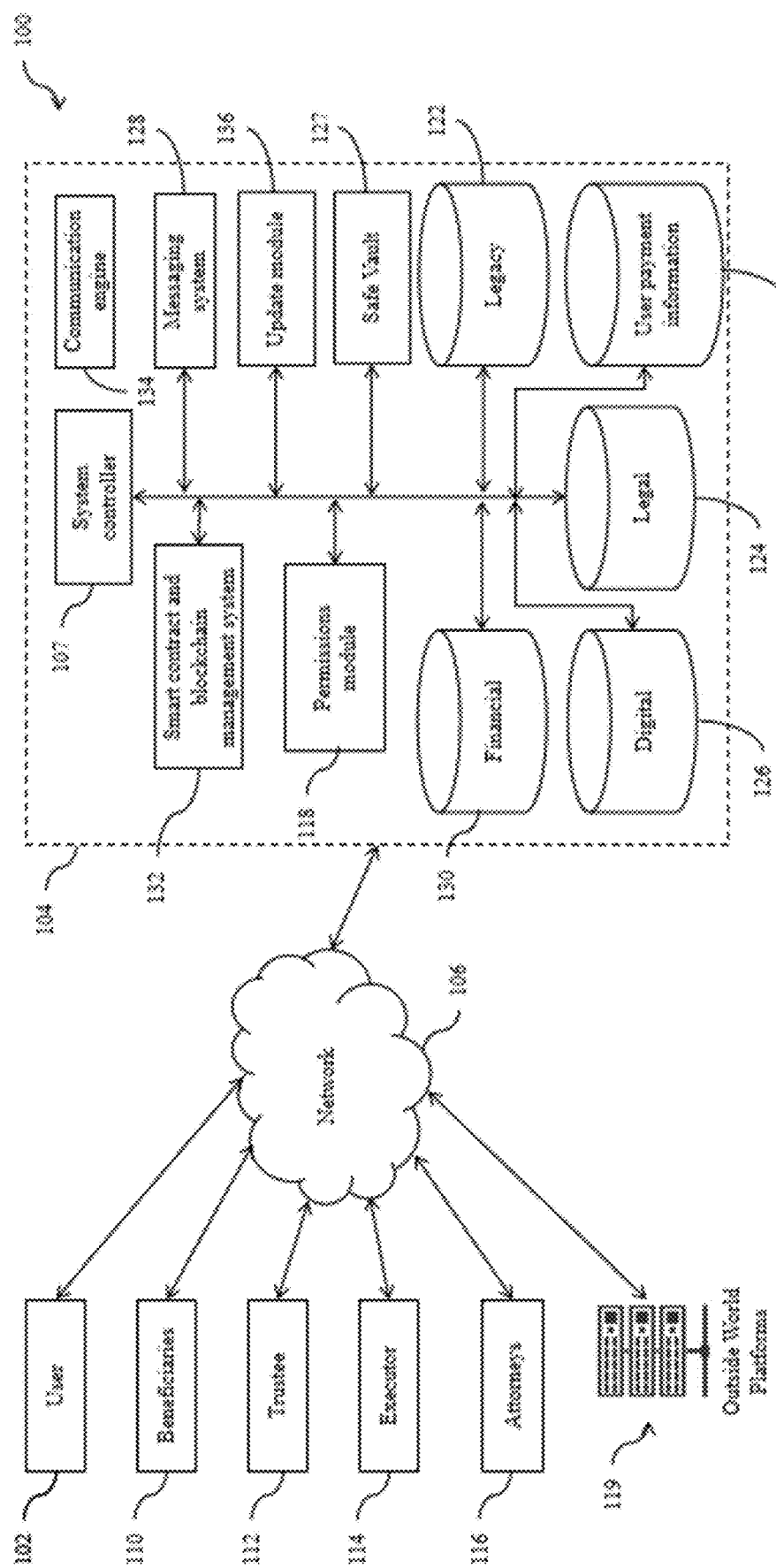

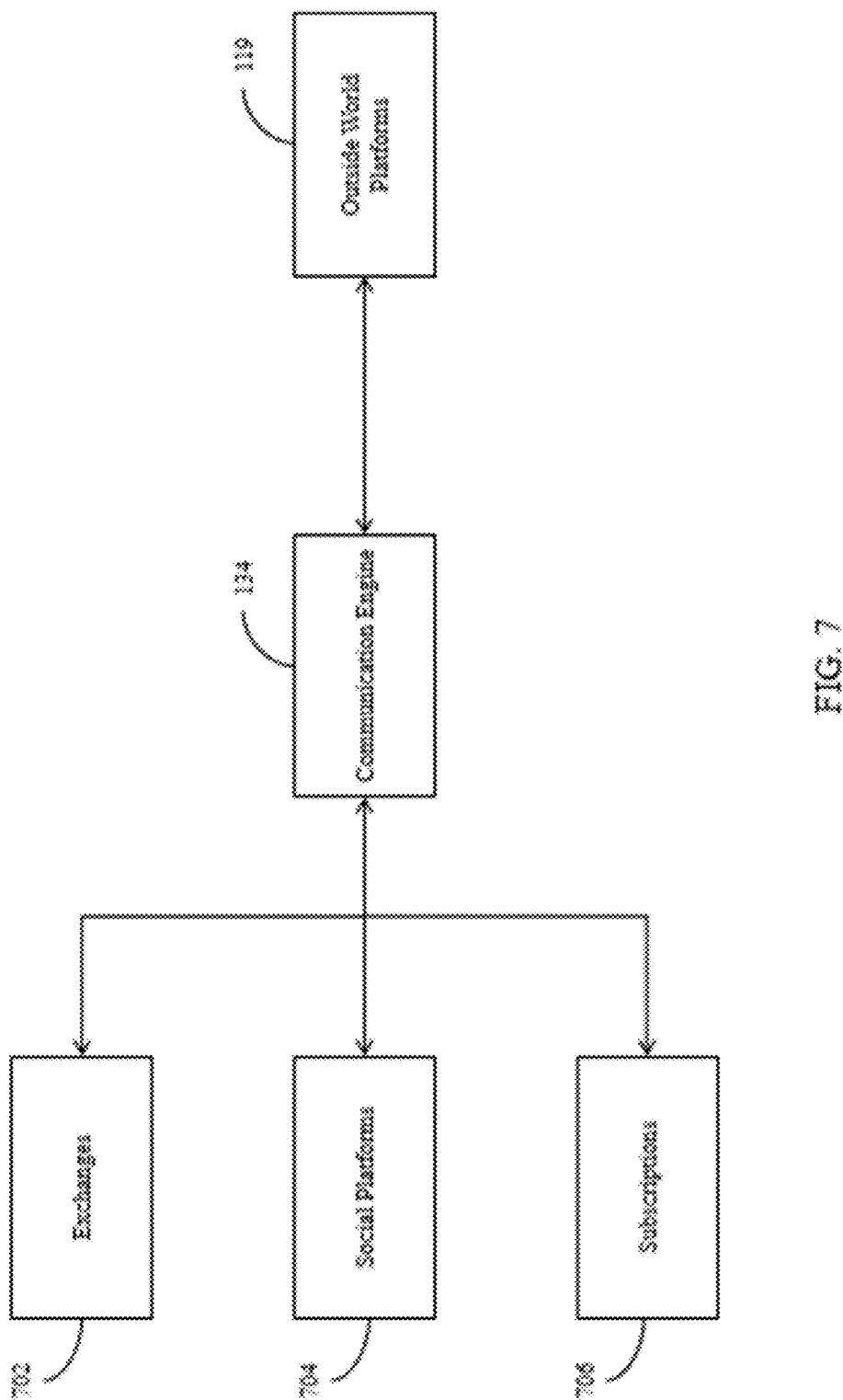

ESTATE PLANNING AND BENEFICIARY MANAGEMENT SYSTEM INCLUDING DIGITAL ASSETS

CROSS-REFERENCE TO RELATED APPLICATIONS

This application is a continuation-in-part and claims priority to U.S. patent application Ser. No. 17/854,366, entitled, "Estate Planning And Beneficiary Management System Including Digital Assets", and filed on Jun. 30, 2022, the entirety of which is incorporated by reference.

TECHNICAL FIELD

The technical field of the disclosed embodiments relate to digital estate planning. More particularly, the disclosed embodiments relate to estate planning and beneficiary management systems that handle digital assets as well as more traditional asset distribution.

BACKGROUND

Traditional estate planning may seem daunting to someone looking to draft a will (testator) and to create a plan to handle other factors surrounding the end of their life and secure their legacy. Different aspects of end of life planning may be decentralized, being handled by different agencies/entities, and multiple intermediaries, for example, banks, attorneys, fiduciaries (trustees, executors), life insurance companies, etc.

Also, the state of a person's estate will likely change significantly over the life of the estate plan, for example, due to changes is asset portfolios, health insurance policies, marriages and divorces, deaths and births of people close to the person, and laws, for example, tax considerations, which may change over time, and differences due to the testator moving to a different state or country. Furthermore, over time physical assets may be acquired, sold or donated, or lost, and investment portfolios may increase or decrease in value.

With the emergence of the digital revolution, many of the things that people own and consume aren't tangible. These include digital assets and accounts such as such as cryptocurrency, non-fungible tokens (NFTs), online banking accounts, social media accounts, email accounts, subscription service accounts, etc.

There is a need to include digital estate planning considerations to the traditional estate planning model. The elements required for planning for the distribution of digital assets should include provisions for identifying and accessing digital assets and accounts. Such a system should include the ability to share critical data with heirs and other beneficiaries. The estate planning process should include services such as an inventory of assets, as well as all the instructions and credentials to locate and access them.

SUMMARY

A estate planning and beneficiary management system according to an embodiment includes a system controller which may prompt and receive from a user information which may be necessary to create and estate planning model. The information may be organized into suites, including a legal suite for information relating to legal documents and directives, a legacy suite for information relating to user legacy information, a digital suite for information passwords and digital asset access information, and a financial suite for information to store traditional and digital assets.

The information may be organized into different modules in the suites, and stored in databases on a system platform. The platform may include other modules, systems, and engines. A system controller controls information and instructions to the modules, systems, and engines from the databases and other memories. The system controller also controls communications with the user and other outside parties and entities. These may include beneficiaries and trusted contacts, attorneys, fiduciaries, and outside world platforms including, for example, exchanges, social platforms, and subscription services.

The user may select beneficiaries and trusted contacts to provide access to certain information in the platform. The user may assign different permission or access levels for various selected documents to the beneficiaries and trusted contacts.

The platform may provide the user with an overview of their estate, and enable the user to update the information in the databases as necessary. The system may also monitor various accounts and notify the user of changes. The platform also provides beneficiaries and trusted contacts more transparency regarding the user's estate, depending on the permission level(s) they have been assigned.

The system may generate smart contracts to lay out distribution of digital assets including cryptocurrency and NFTs, and code how the assets will be distributed in the event of the user's demise. The smart contracts may utilize warm and cold wallets to control the transactions.

The system may monitor for a triggering event, such as death or incapacitation, and once a triggering event is detected and verified, message the beneficiaries and trusted contacts. The system may also automatically execute the instructions in the smart contracts to perform transactions between the user's wallets and the beneficiaries wallets. The system may also automatically notify outside world platforms of the user's death and directives for the individual platform laid out in the user's will.

BRIEF DESCRIPTION OF THE DRAWINGS

FIG. 1 is a system diagram of a estate planning and beneficiary management system according to an embodiment

FIG. 7 shows a system for notifying outside world platforms of the user's death and directives regarding their services according to an embodiment.

DETAILED DESCRIPTION

Figure 2A:
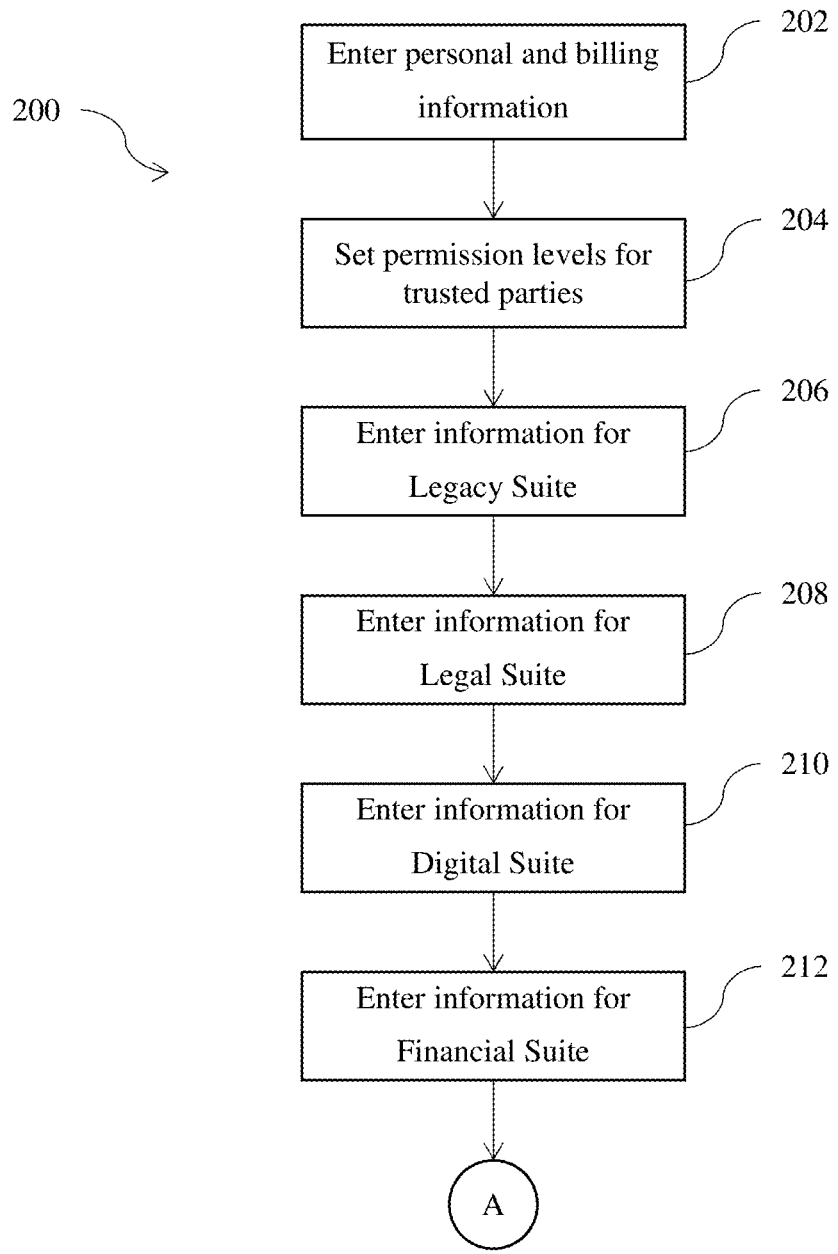
FIGS. 2A and 2B show a flowchart describing a user sign-up operation according to an embodiment.

FIG. 1 shows an estate planning and beneficiary management system 100 designed to streamline the legacy transfer process for physical and digital assets, with the sharing of critical information to beneficiaries and digital asset custodians, social platforms, and cryptocurrency and NFT exchanges.

A user 102 who wants to use the system 100 may communicate with a system platform 104 via a network 106. The user 102 may access a website associated with the system, and explore the various services, FAQs, company information, etc., provided by the site.

The website may be generated by a system controller 107 which also manages the other modules and databases in the system platform. The system controller may communication with entities outside of the system platform via the network 106. The controller may write to and read from the various databases and memories. The controller may also control transmission of data to the various service modules in the system platform and provide commands for performing various operations as necessary.

Figure 2B:
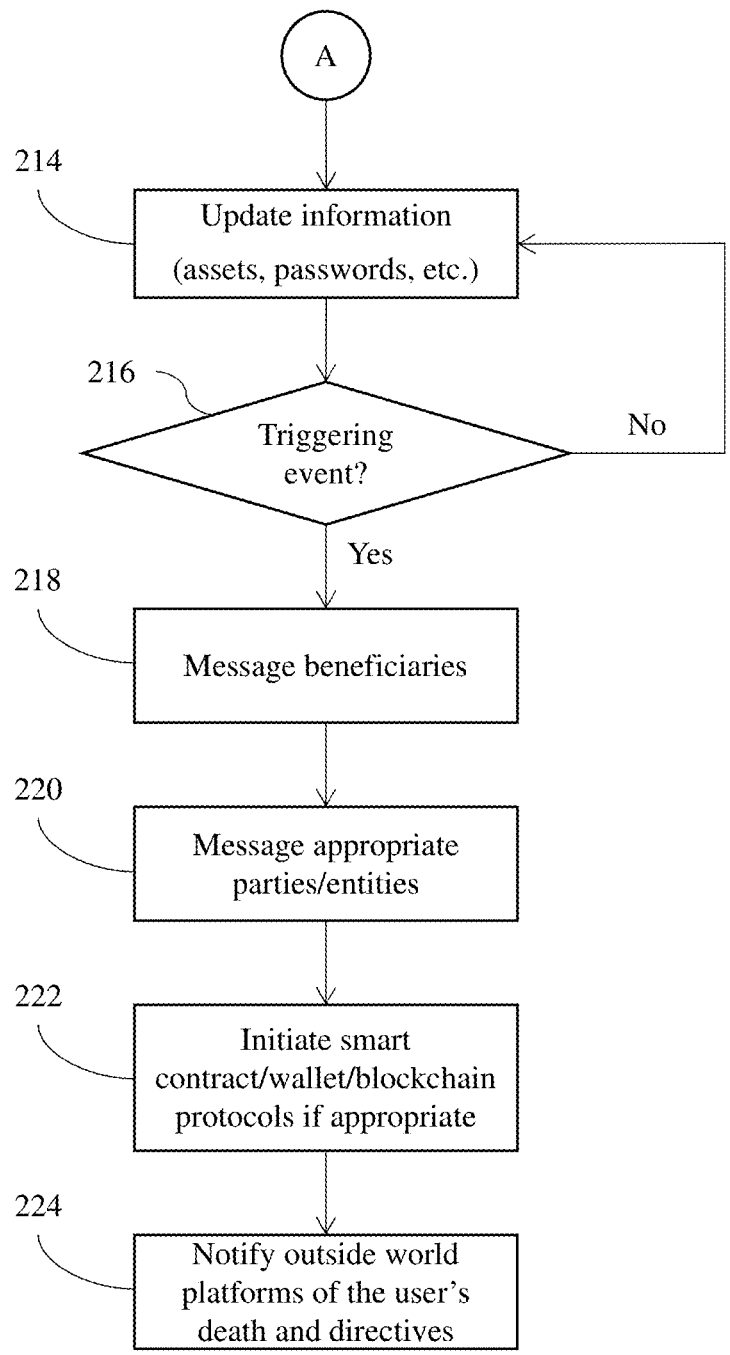

FIGS. 2A and 2B show a user sign-up operation 200 according to an embodiment. The user 102 may subscribe to or purchase services offered by the system platform 104. The user may enter personal and payment information, which is stored in a user payment database 108 at the system platform (block 202).

Once membership in the system is established, various web pages may be provided to the user to collect information necessary to prepare an estate planning model for the user. This may include a page requesting contact information and permission, or access, levels for trusted parties (block 204), for example, potential beneficiary(-ies) 110, trustee(s) 112, executor 114, and attorney(s) 116. This information may be stored at and utilized by a permissions module 118 at the system platform.

The system platform 104 may also communicate with outside world platforms 119 including, for example, exchanges, social platforms, and subscriptions, which is described in relation to FIG. 7 below.

Figure 3A:
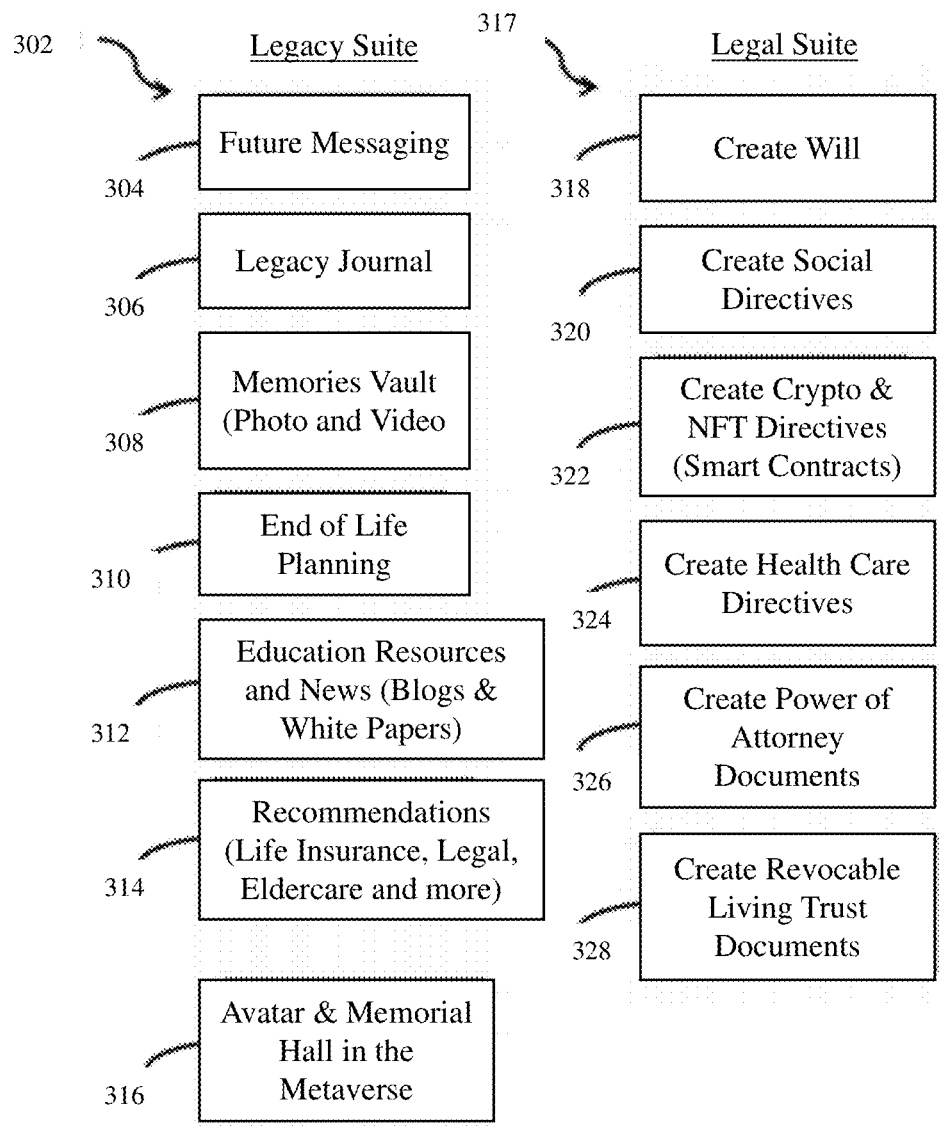
FIGS. 3A and 3B shows different modules organized into suites according to an embodiment.
Figure 3B:
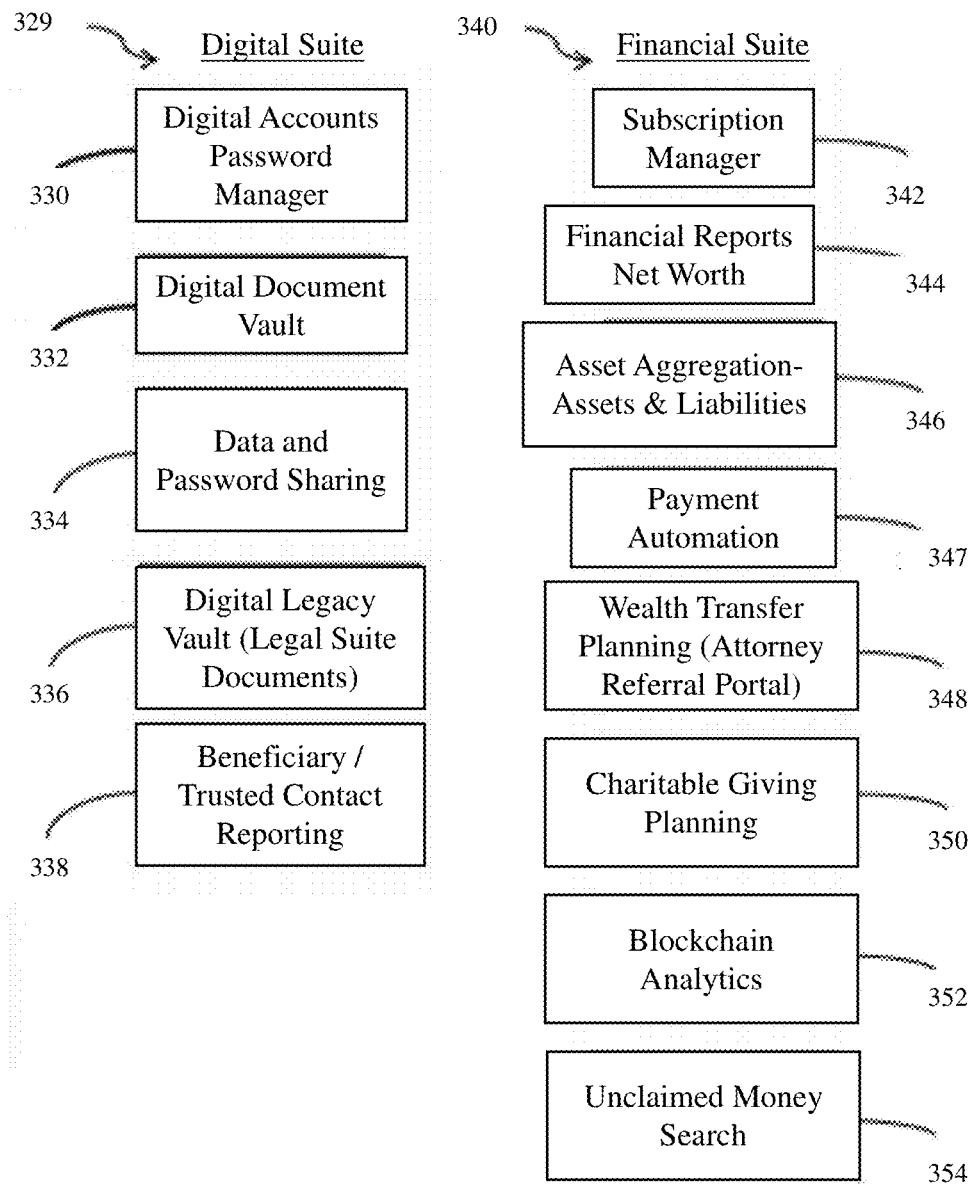

The user may enter information for the various service modules which may be organized into suites, as shown in FIGS. 3A and 3B. The system website may prompt the user for information, including the uploading of documents and other type of files, to populate the service modules and develop a estate planning model for the user.

In an embodiment, the system website may prompt the user to enter information for modules of a legacy suite 302 (block 206). This information may be stored in a legacy database 122 in the system platform.

A future messaging module 304 may enable the user to send a digital time capsule on a specific date, for example, on a loved one's birthday or anniversary, before or after the user has passed away. The user may specify the date for the message to be sent and the recipients' electronic address (e.g., email, or social platform page). The digital time capsule may include, for example, photos, recorded videos, songs, and personalized messages. A legacy journal 306 may be used for documenting key events, milestones and achievements in the user's life. A memory vault 308 may provide secure file storage for images, videos, and music.

An end-of-life planning module 310 may provide the user with funeral planning and advance directives options. The module may prompt the user to provide specific instructions on how the user would like final services handled and how they would like to be eulogized. An education resources module 312 may prompt the user to identify, for example, blogs, white papers, and other materials the user considers important. A recommendations module 314 may provide the user with recommendations regarding life insurance, legal consideration, and eldercare. An avatar and memorial hall module 316 may enable the user to establish an avatar and vocal presence in the metaverse where the user and loved ones can visit to access memories and recordings.

The system website may prompt the user to enter information for modules of a legal suite 317 (block 208), which may be stored in a legal database 124 in the system platform.

A will creation module 318 may prompt the user for information which may be used to create a last will and testament. A social directives creation module 320 may enable the user to choose which sites and social media platforms the user would like to have deleted, memorialized, or made accessible. A digital inheritance module 322 may prompt the user for information regarding digital assets, for example, NFT, cryptocurrency, and blockchain. A health care directives creation module 324 may prompt the user to specify which actions should be taken for their health the user is no longer able to make decisions for themselves due to of illness or incapacity. A power of attorney creation module 326 may be used to store power of attorney documents. A revocable living trust creation module 328 may be used to store revocable living trust documents.

The system website may prompt the user to enter information for modules of a digital suite 329 (block 210), which may be stored in a digital database 126 in the system platform.

A digital accounts and password manager 330 may prompt the user for passwords and account access details for safeguarding in a Safe Vault 126 at the system platform 104. The module and Safe Vault enable the user to securely store and manage all of their login credentials and account details. A digital document vault 332 may be used for secure and encrypted file storage in which the user can store or backup their most important files, for example, birth certificates and financial records. A data and password sharing module 334 enables the user to transfer important files to a beneficiary or trusted contact through the digital document vault using complete end-to-end encryption, and provides when the files are downloaded. A digital legacy vault 336 may provide secure and encrypted file storage for legal documents, for example, contracts, agreements, will, healthcare directives, trust documents, power of attorney, living trust and cryptocurrency and NFT directives.

The Safe Vault may include tools to help users securely store and manage all of their login credentials. The user may securely store asset and investment account information, credit and debit card account information, online banking information, and information for other accounts, such as PayPal. The user may store PINs, credit card numbers, online banking credentials, etc., in the vault's password manager, and access it securely from anywhere on a computer or mobile device. This information is stored in a centralized vault for the user's account.

In an embodiment, security may include AES-256 bit encryption and multiple techniques to protect the user's data at rest and in transit. With a built-in "SecureViewer" function, the user may view PDF files, images, and other document types without leaving a digital trace. This function may be particularly useful if the user needs to view highly sensitive information securely.

A two-factor authentication may also be a selectable security option for access to the system platform 104. With strong SMS authentication, your the user's login information remains secure even if, for example, the user's password is discovered by a hacker. The login may be protected by an additional code, which may be sent, e.g., by text message, when the user logs in to the system. The user's information may be accessed through any web browser, but for convenience, there may also be applications that can be installed directly on the user's devices. These may include, for example, applications for Windows, OSX, iOS, and/or Android that will allow the user secure access to their information.

Figure 4:
FIG. 4 shows an exemplary system web page for inviting beneficiaries and trusted contacts.
Figure 5:
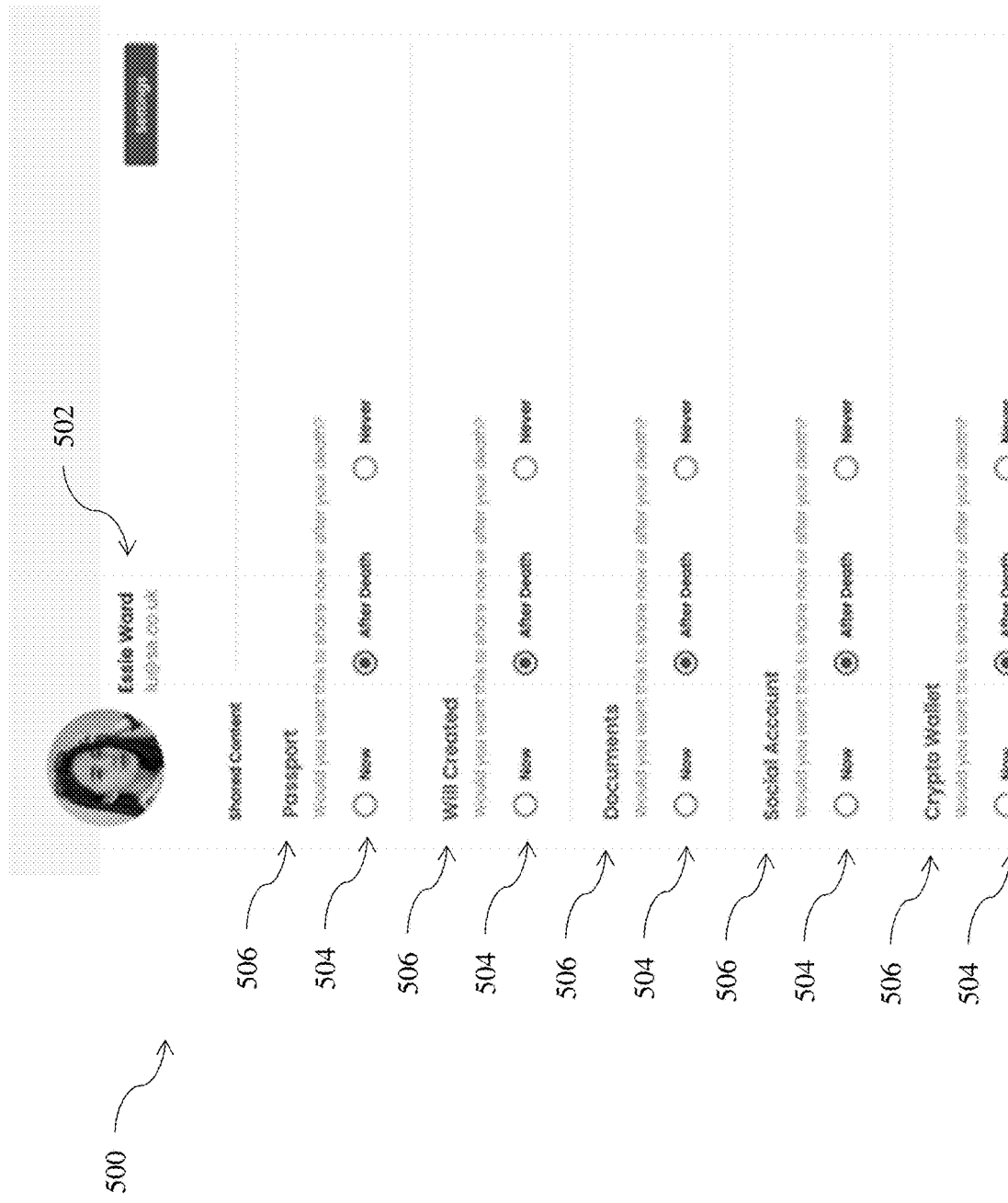
FIG. 5 shows an exemplary system web page for setting beneficiary and trusted contact access levels.

For each of the modules in the various suites, the user may assign access levels for beneficiaries and trusted contacts for each account and file. FIG. 4 shows an exemplary system web page 400 in which the user may invite trusted contacts 402 and identify the number of documents 404 they may have access to. This may link to the web page 500 shown in FIG. 5, which enables the user to set access levels for different documents. FIG. 5 shows an exemplary system web page 500 for setting beneficiary and trusted contact access levels. For each beneficiary or trusted contact 502, the user may select an access level 504 (e.g., "after death") for a particular document 506 (e.g., passport). A beneficiary/trusted contact reporting module 338 may report changes to the various documents to the beneficiaries and trusted contacts based on their access level via a messaging system at the system platform 104.

The system website may prompt the user to enter information for modules of a financial suite 340 (block 212), which may be stored in a financial database 130 in the system platform.

A subscription manager 342 may be used to record an inventory of subscriptions and access information so beneficiaries or trusted contacts can manage subscription assignments as outlined in legal directives. A financial reports module 344 may provide a user with financial snapshot of net worth and provide a summary of current financial affairs. An asset aggregation module 346 may link assets and liabilities for personal and business accounts and provide instructions for asset transfers. An automated payment module 347 may enable the user to create scheduled automatic payments from the trust account, which may be processed through a secure online system.

A wealth transfer planning module 348 may act as a referral system to an attorney who would may be able to provide counseling for more personalized and complex needs. A charitable giving module 350 may enable the user to make charitable contributions from a trust. A blockchain analytics module 352 may identify investment opportunities in cryptocurrency markets. An unclaimed money search module 354 may access various records databases to identify unclaimed money in the user's name.

With the information entered during the sign up operation 200, the information needed to identify and access the user's physical and non-physical assets may be stored centrally at the system for future review, updating, and eventually, distribution. This may be used to guide beneficiaries, providing a clear road map for access as provided and instructed by user.

For physical assets, such as jewelry, art, automobiles, collectibles, etc., this information may include the physical location of the asset and, in certain cases, the physical location of a proof of ownership, such as a certificate of title for an automobile.

For financial instruments and financial products such stocks, bonds, life insurance policies, bank accounts, loans, mortgages, etc., this information may include the location of documents, and for those with an online presence, website addresses, passwords, login ids, and secondary verification information, e.g., challenge questions, for accessing the documents.

For digital assets, the system may use wallets (hot, warm, cold) and smart contracts to manage their inheritance in a much more reliable and confident manner. The goal of a blockchain smart contract is to simplify business and trade between both anonymous and identified parties, sometimes without the need for a middleman. A smart contract scales down on formality and costs associated with traditional methods, without compromising on authenticity and credibility. The use of smart contracts enable the system to offer complete transparency and eliminate the possibility of modifications once the contract is made, offering the user the ability to hide their assets and wishes behind a solid wall of security.

Furthermore, blockchain technology makes it almost impossible to forge records. These factors enable the system to avoid problems such as inheritance theft. Inheritance theft can take many forms, ranging from manipulating the person's wishes while they're still alive, to theft and embezzlement that occurs after the death. To eliminate such threats, the system enables a class of smart contracts which allows for the removal of any and all intermediary legal parties, i.e., lawyers and law firms, if desired, while distributing the user's estate.

Figure 6:
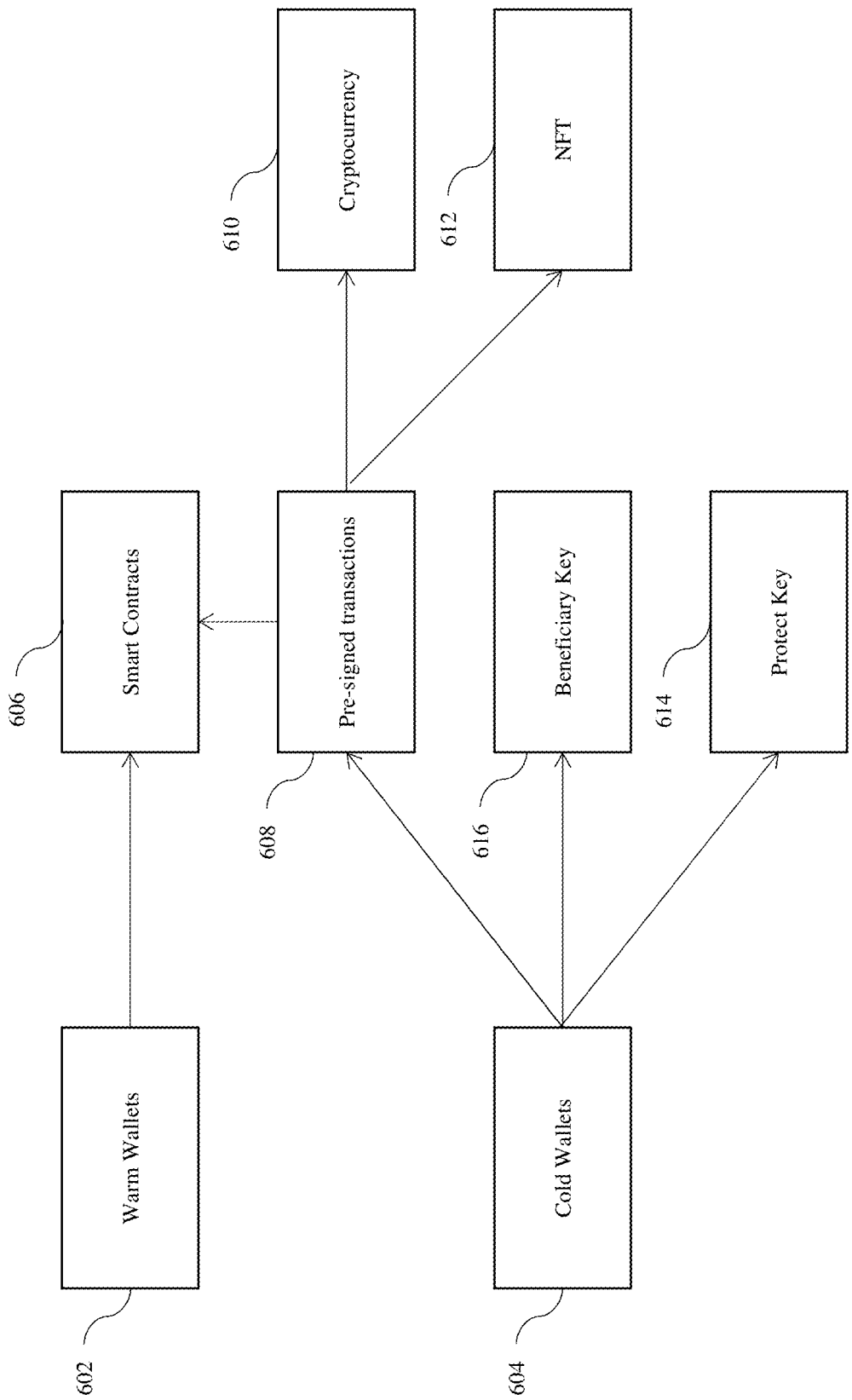
FIG. 6 shows how wallets and smart contracts interact in the system according to an embodiment.

FIG. 6 shows how warm wallets 602, cold wallets 604 and smart contracts 606 interact in the system according to an embodiment. De-centralized cryptocurrency exchanges such as TrustWallet and Metamask may use wallets to store and perform cryptocurrency transactions. For example, Trust-Wallet is software that generates wallet addresses and encrypted private keys that may be used to send and receive Ethereum cryptocurrency "ether" (ETH) and other cryptographically secured tokens (or "virtual currency"), allows users to browse third party decentralized applications ("DApps") through the mobile application's DApp browser, and facilitates the submission of virtual currency transaction data to Ethereum-based blockchains without requiring the user to download or install the associated Ethereum-based software to their local device. A private key is connected to the wallet address and together they can be used to authorize the transfer of virtual currency to and from that wallet address. Various encryption schemes, for example, ECIES (Elliptic Curve Integrated Encryption Scheme), may be used to create and access wallet(s).

In an embodiment, the system platform may support of multiple types of blockchains, such as Solana, which are not Ethereum-based. This may be enable cross-chain asset management.

The system 100 may use smart contracts 606 to control asset distribution. The user can designate how much from each of their wallets should be distributed to one or more beneficiaries' wallets, and the system can code that into a smart contract. The smart contracts may be administered by a smart contract and blockchain management system 132 at the system platform 104.

In an embodiment, the user may bequeath a certain amount of assets, such as crypto coins, to a beneficiary, for example five ETH, from their wallet. While the user is alive, the value of assets in the wallet may changes, for example, may decrease to less than five ETH or grow more than five ETH. At the time of distributions, the beneficiary may claim up to the bequeathed amount, in this case, five ETH.

Hot wallets, or software wallets, are cryptocurrency wallets that are always connected to the internet and cryptocurrency network. Warm wallets are digital asset storage systems that function much like hot wallets, their main difference being that they are usually software that is downloadable, unlike the hot wallets offered by most exchanges, and usually require the use of 12-digit passcodes or PIN numbers for its user authentication mechanism rather than passwords set up on the exchange, like hot wallets. Since warm wallets are always connected to the internet, the system may create smart contracts 606 based on transactions set up by the user on the system website.

A cold wallet, otherwise known as a hardware wallet, is a physical device that keeps cryptocurrency completely offline. Since cold wallets are offline, pre-signed transactions 608 are necessary to create a smart contract, as well as perform cryptocurrency 610 and NFT 612 transactions. A private key and public key are necessary to access the cold wallet. A protect key 614 may be the original private key held by the user. A beneficiary 616 key may be a copy of the user's private key.

With regards to NFT transfers, as mentioned above, blockchain technology makes it almost impossible to forge records, ensuring that the purchaser of an NFT holds a token representing sole ownership of the original work that he or she has purchased. Because each NFT is unique, they cannot be traded for equal value like cryptocurrency or traditional forms of currency are traded. In the overwhelming majority of instances, NFTs can only be accessed using a password or a personal key. In order to access the user's NFT(s), this information must be passed on to future beneficiaries.

Individuals seeking to pass on crypto assets, such as cryptocurrency and NFTs, and other online assets should document a "digital legacy" to accurately describe important account details and store information about how to access the assets within these accounts. The user may have the ability to store sensitive information in the password vault, however if they are not comfortable doing so, the user would need to provide the location of where they stored the cold wallet and the location of where they maintain the key to share with an executor upon death.

The process of storing the digital will and distributing digital assets may operate "on-chain", that is, through blockchain processes, and be decentralized in a way that all of these processes may be performed with or without the dApp through smart contracts. All the other modules, for example, social platforms, centralized exchanges, subscription services, etc., may only operate off-chain through the system platform.

The information related to user's digital will, including cryptocurrency accounts and NFTs, for their hot wallets may be on chain with proportions of distribution to their relevant beneficiaries. The user will provide the beneficiaries' wallet addresses, and the percentage or value of the tokens to be transferred, e.g., ERC20 (cryptocurrency), ERC721 (NFT), or ERC1155 (multi-token). The digital will require user to pre-sign the transactions, and upon their death, the assets will be open to claim on the beneficiaries' end. The system may support all EVM based blockchain assets and Solana.

The NFTs will only have atomic values and not percentages as may be available with cryptocurrency accounts. The verification process may require a court legal order and the executor (human or platform-based, e.g., a "digital executor") to trigger the process of legacy transfer.

Crypto assets including NFTs may have two main destinations; one being the user-designated beneficiaries and the other being a back up wallet created from platform's wallet service, which can be used to protect Crypto assets in case of any panic situation or in case the user loses or forgets their current wallet credentials.

Having the different components of the digital will, e.g., an "NFT will" and "crypto will" on-chain in the shape of smart contracts gives full transparency and control to the user, ensuring no third party is involved in the process.

In an embodiment, the system may include a communication engine 134 (FIG. 1), which may be in communication with the various outside world platforms. Information for these platforms, including exchanges 702, social platforms 704, and subscription services 706, may be provided by the user and stored in databases in the various suites. These platforms 119 may include for example, platforms such as Binance, Coinbase, Kraken, Facebook, Instagram, Snapchat, TikTok, Netflix, Amazon Prime, etc. The communication engine 134 may deal with the relevant resources in these platforms and provide all the required documents and detailed will directives to verify the event of death and the user's wishes laid out in the user's will surrounding around these platforms, including access by any beneficiaries that they had assigned.

The state of a person's estate will likely change significantly over the life of the estate plan, for example, due to changes is asset portfolios, health insurance policies, marriages and divorces, deaths and births of people close to the person, and laws, for example, tax considerations, which may change over time, and differences due to the testator moving to a different state or country. Furthermore, over time physical assets may be acquired, sold or donated, or lost, and investment portfolios may increase or decrease in value.

The user may update the information in the system platform (block 214, FIG. 2B) as it changes over time. This may include updating financial information, as well as adding and removing beneficiaries, changing passwords as necessary, adding or deleting documents and media and other digital content, etc. The user may communicate these changes to the system platform 104, which may make these changes using an update module 136. Depending on the user's service package and access provided by the user to the system, the update module 136 may monitor entities with online presences, such as banks and cryptocurrency exchanges, and notify the user of changes to their portfolio. The messaging system 128 may also notify beneficiaries and trusted contacts as documents are modified by the user, depending on their access level. This provides visibility to the user of their overall estate, and transparency to beneficiaries and trusted contacts as documents are added, deleted, or modified.

The system platform may monitor for a triggering event, such as death or incapacitation (block 216). For example, the distribution process may be triggered automatically once the user doesn't respond to a scheduled check-in confirming they are still alive and well.

If such an event is detected, the system may wait for verification. Upon verification, the system may message the beneficiaries, trusted contacts, and other appropriate parties/entities (blocks 218 and 220, respectively). The system may have the capability to provide digital asset notification to any jurisdictional authority dealing with matters of probate and the administration of estates if the executor or digital executor needs to provide such information to those authorities.

The smart contract and blockchain management system 132 may automatically execute the transactions as provided for in the smart contracts (block 222), However, beneficiaries may be required to claim the assets rather than just directly transfer into their wallets. The communication engine 134 would notify the outside world platforms (block 224) in accordance to their communication channel which they have outlined on their site for death notifications.

Figure 8A:
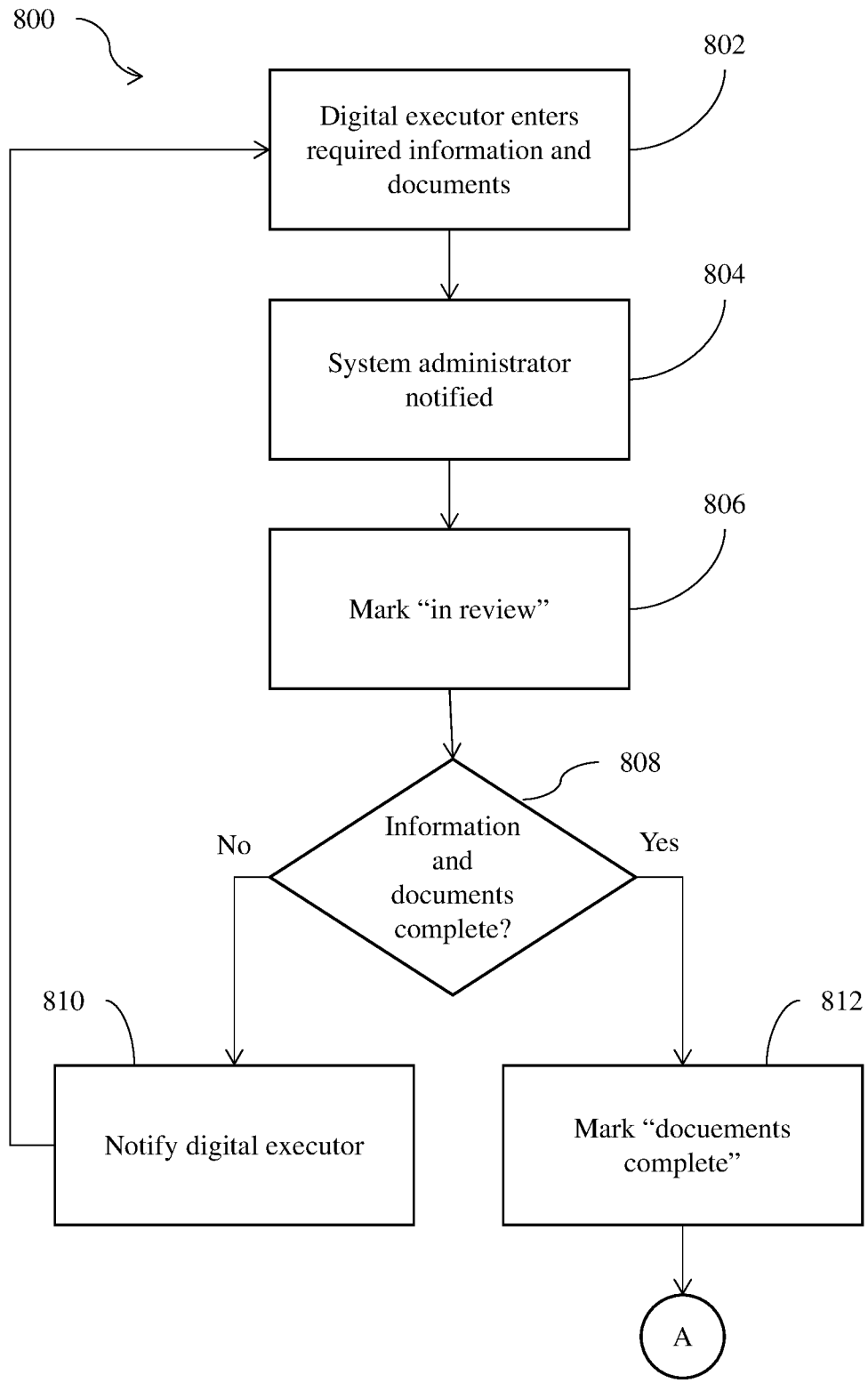
FIG. 8A-C is a flowchart describing after life protocols according to an embodiment.
Figure 8B:
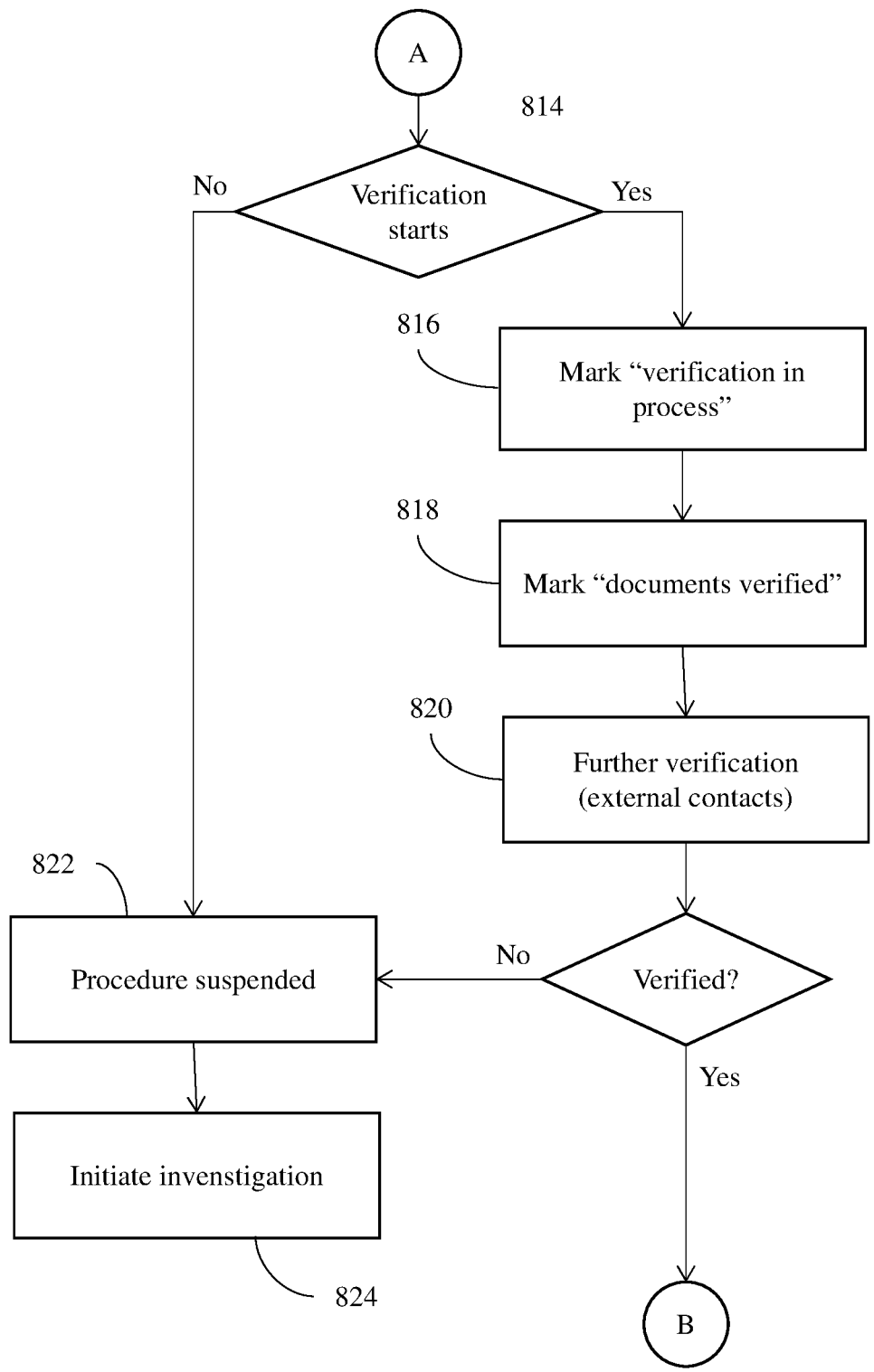
Figure 8C:
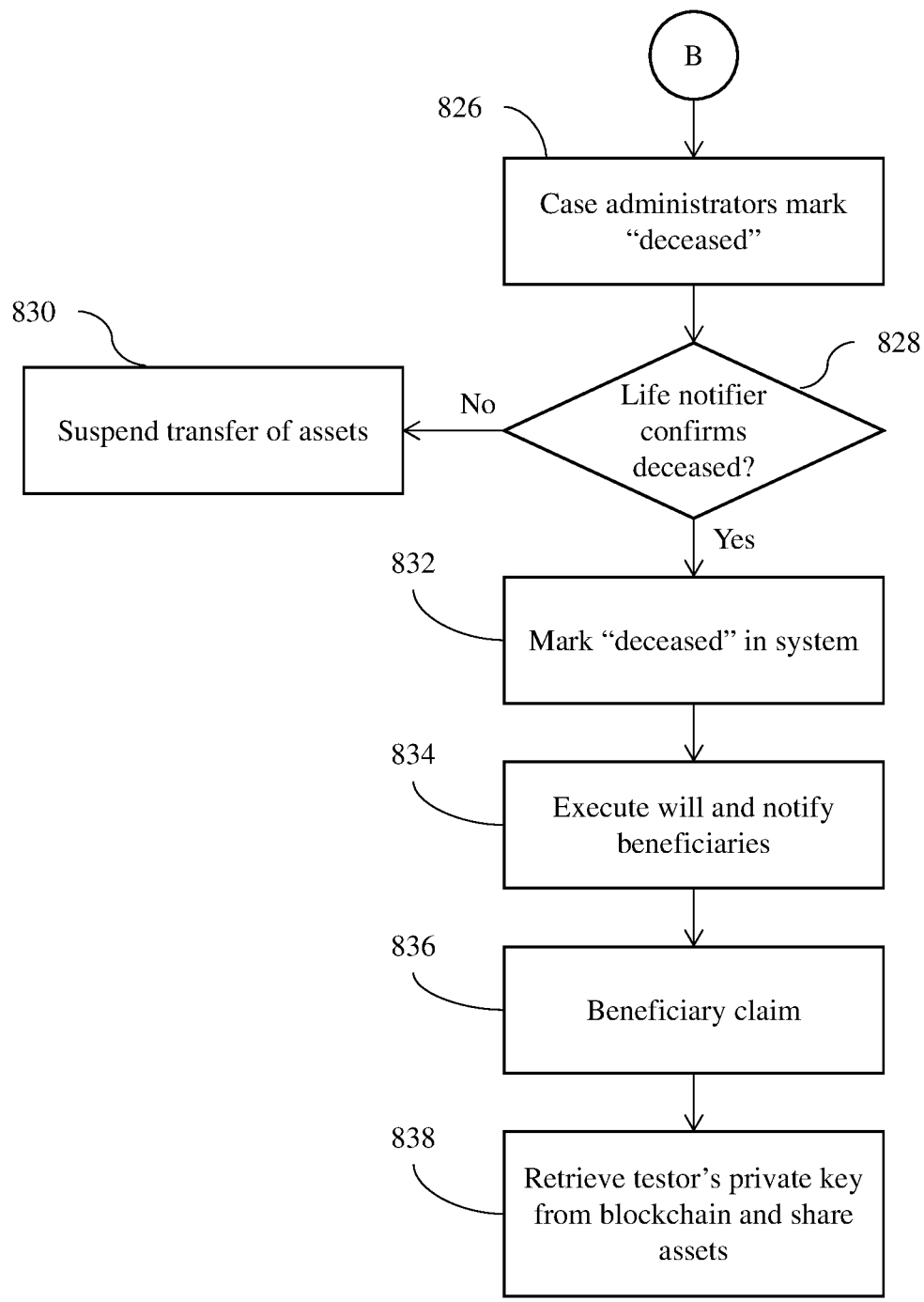

In an embodiment, the system may follow a number of protocols to carry out post-death transfers of digital and crypto assets. Referring back to FIG. 2, the triggering event may be reported by an outside party, such as the digital executor. After the triggering event is identified (block 216), the system may perform an after life protocol 800, shown in FIG. 8, prior to executing the transactions as provided for in the smart contracts (block 222).

In an embodiment, the digital executor may access the system and initiate a digital asset transfer process for the deceased user (testator). The digital executor may be prompted to enter necessary information and upload required documents (block 802). Required documentation, and processes, may differ depending on the user's region, residence, and individual situation. The required documents may include, for example, a death certificate, the testator's last will and testament, and/or probate documents (for example, probate, letters testamentary, letters of administration, affidavit for collection, small estate affidavit, etc. The required documents may also include proof of identification for the digital executor, which may be a person or persons, such as valid government-issued photo identification of the person(s) and a letter signed by the named digital executor or named executor in the probate documents providing instructions to initiate the digital asset transfer process.

Once the required information and documents are provided, a system administrator, which may be any of a team of administrators of the system, may be notified (block 804) and mark the case as "in review" in the system (block 806). If the information and documents provided are not sufficient, the digital executor may be notified (block 810). If the information and documents are sufficient, the case may be marked as complete (block 812), initiating a verification process (block 814).

The verification process may have a certain time period for completion, for example, thirty days. Once the document verification process begins, the status of the case may be updated to "verification in process" in the system (block 816). Once the required information and documents have been verified internally, the case may be marked as "documents verified" (block 818).

In an embodiment, further external verification may be performed, for example, by the system administrator contacting beneficiaries and trusted contacts, for example, by email, messaging, or through the system (block 820). If there is a question about the veracity of the information and documents at this stage, further processing may be suspended (block 822) and an investigation initiated (block 824).

Otherwise, case administrators (three in this embodiment) may be required to confirm the completion of the document verification portion of the verification process (blocks 816, 818, and 820). In an embodiment, a case administrator may be a system employee assigned to the case and/or a designated person in some way connected to the testator, such as a beneficiary or trusted contact.

In an embodiment, the case administrators may provide digital signatures in the form of "option wallets" linked to the system, which may be opened, for example, by selecting a "confirm" button in the user interface. Once all of the case administrators have confirmed the document verification portion, the case may be updated to "deceased" (block 826).

In an embodiment, to avoid the possibility of fraud or error in the determination that the testator is in fact deceased, the system may initiate a "life notifier" to confirm the death of the testator (block 828). In an embodiment, the notifier may be run on, for example, a serverless platform such as AWS lambda, Google Cloud, etc.

The notifier may actively attempt to contact the testator through various means based on the testator's contact information stored in the system. Conventional and/or AI-based online public document searches may also be performed, as well as monitoring the testator's accounts, e.g., banking, social, etc., for any activity through any permissions granted to the system. If the system detects that the testator, or someone with the testator's credentials, tries to login to the system, or any other indication the testator is not in fact deceased during a certain grace period, the system will suspend the transfer of assets (block 830).

If the notifier does not detect such an indication, the testator may be marked as "deceased" in the system (block 832) and the will executed and beneficiaries notified (block 834). The beneficiaries may then claim their inheritance in the system (block 836). For each claim, the user's private key may be retrieved in the blockchain to complete a transaction between the user's wallet and the beneficiary wallet and the assets shared (block 838).

In the case of will fulfillment in the event of the testator's death, the private key must be made available to the system to access the user's wallet(s) in order to distribute the crypto funds according to the user's wishes and fulfill the terms of the will. However, as the private key is sensitive, a degree of security must be maintained.

In an embodiment, the user may enter their private key for a given wallet into the system. The system may divide the key into portions, or "shards", each shard being encrypted and secured in a different portion in the blockchain.

At the time of asset distribution, after the user's death, the system may access the private key shards on the back-end and reconstruct the private key for the purpose of fulfilling the terms of the will. As this process occurs at the system back-end, the private key is never exposed.

In an embodiment, if the process is not completed in the set time period, e.g., 30 days (block 814), the process may be suspended (block 822) and an investigation started (block 824).

Legacy Lifeline Wallet

In an embodiment, the system may provide an emergency backup, or lifeline, wallet to back up and recover a user's asset(s). In one embodiment, in the event the user with a wallet connected to the system loses their credentials to the connected wallet, for example, a private key, password, or seed phrase, the user may access their lifeline wallet which provides a feature to backup the assets of a connected wallet.

In an embodiment, when a user connects their wallet to the system, the system may store the user's private key for the wallet in the blockchain, to be recovered at the time a transaction is requested or required under the smart contract. The user may access a connected wallet through the system by entering a linked identifier, such as their email address, and the system will recover the user's private key for the connected wallet and enable the user to view the contents of the wallet and perform transactions.

Each crypto transaction may require a fee, which may fluctuate over time. On the Ethereum blockchain, for example, "gas" refers to the cost necessary to perform a transaction on the network. Gas prices are based on supply and demand for the network's validation requests. Transaction prices are based on a gas limit and gas price, and are denoted in tiny fractions of ETH called gwei, or in ETH. A wallet may incorporate a gas tank, where ETH to pay for transactions is stored.

Usually, to transfer assets from a wallet, the owner of the wallet has to pay a gas fee using a gas tank set up on the same blockchain which carries owner's assets, but that again requires the user to have access to their wallet. In the case of lost credentials, the system may generate a backup wallet and transfer the owner's crypto assets of the connected wallet to the backup wallet by following a simple procedure of card payment from the added payment method on the system. However, setting up a gas tank for the transaction of transferring the crypto assets from the owner's original wallet to the backup wallet, involves a certain amount of time and effort, which may be problematic and stressful in an emergency situation. As such, the system may pay the gas fees for the transaction from its own gas tank on the back-end to support hassle-free backup of the assets, estimate the gas price for the transaction, and charge the user using conventional methods, such as a credit card payment, simplifying the process for the user.

As soon as assets get backed up, the user can transfer assets from this backup wallet, also referred to as an emergency wallet or lifeline wallet, as they wish.

The lifeline wallet may be accessible through the system and may not require an exclusive password or credentials other than the system login itself. The system login may be the user's primary email address and given the relevant provider, the user can connect through the provider and login a without password.

In the case the user feels panicked, for example, because of a malicious attack or because their sensitive information, e.g., the private key or a password to the wallet, is possibly exposed, the system may provide the user a service to connect their wallet on-the-go and initiate a transfer of all their assets to a backup wallet. The backup wallet may be kept private by using the system as a layer. Once the user has the wallet connected, the user pays the transfer charges for the transfer of assets from the user's wallet to the backup wallet through a conventional payment system such as a credit card to avoid wasting time and additional hassle in such sensitive scenarios.

The system may manage a gas tank at the back-end to enable the user to pay the gas price using conventional payment methods, e.g., their credit card. However, the fluctuation in the gas price creates a challenge in calculating the gas price to charge the user. In an embodiment, a machine learning model is trained using historical gas price and gas fee information, for example, from similar transactions relating to creating backup wallets for other users. This information may be used to train the machine learning model, which may become more accurate over time, thereby enabling a more accurate calculation of the gas price to charge the user and avoid over- or under-charging.

Figure 9:
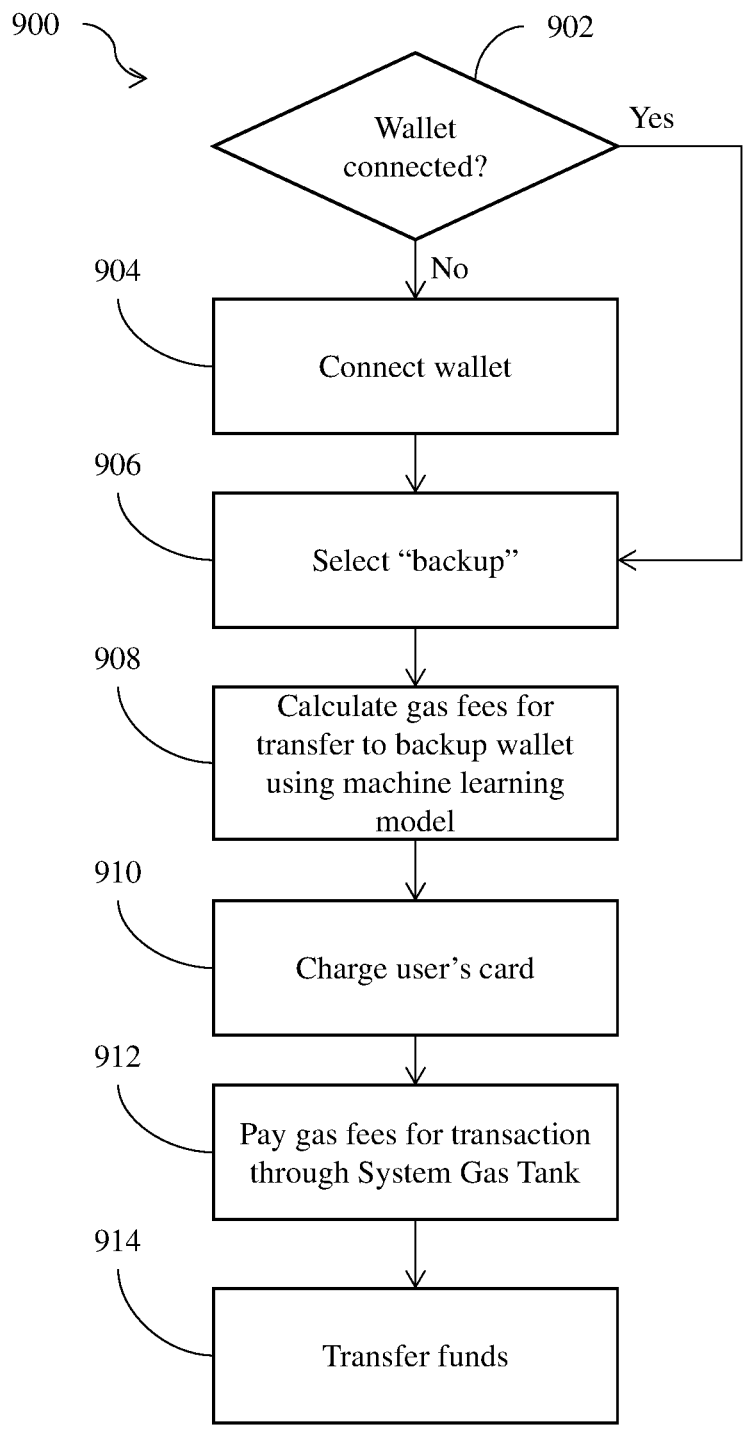
FIG. 9 is a flowchart describing a lifeline wallet operation according to an embodiment.

FIG. 9 describes a lifeline wallet operation 900 according to an embodiment. The system determines if the user has a wallet connected to the system (block 902). If not, the system may prompt the user to connect a wallet for use as a backup (emergency or lifeline) wallet (block 904). The user may select a connected wallet and instruct the system to backup the wallet (block 906). The system may use the gas fee-trained machine learning model to generate an estimate for the gas fee for the transfer of funds from the connected wallet to the backup wallet (block 908).

The system may then charge the gas fee to the user's credit card (for example) (block 910). The system may then pay the gas fees for the transaction through the system gas tank (912) and complete the transfer (block 914).

Password Manager

In an embodiment, the system may include a password manager, which may be used during the user's life or in after life protocols. The password manager may include an encryptor and a decryptor, which may be shared on the blockchain with the user's trusted contacts in the system using the user's public and private keys.

Figure 10A:
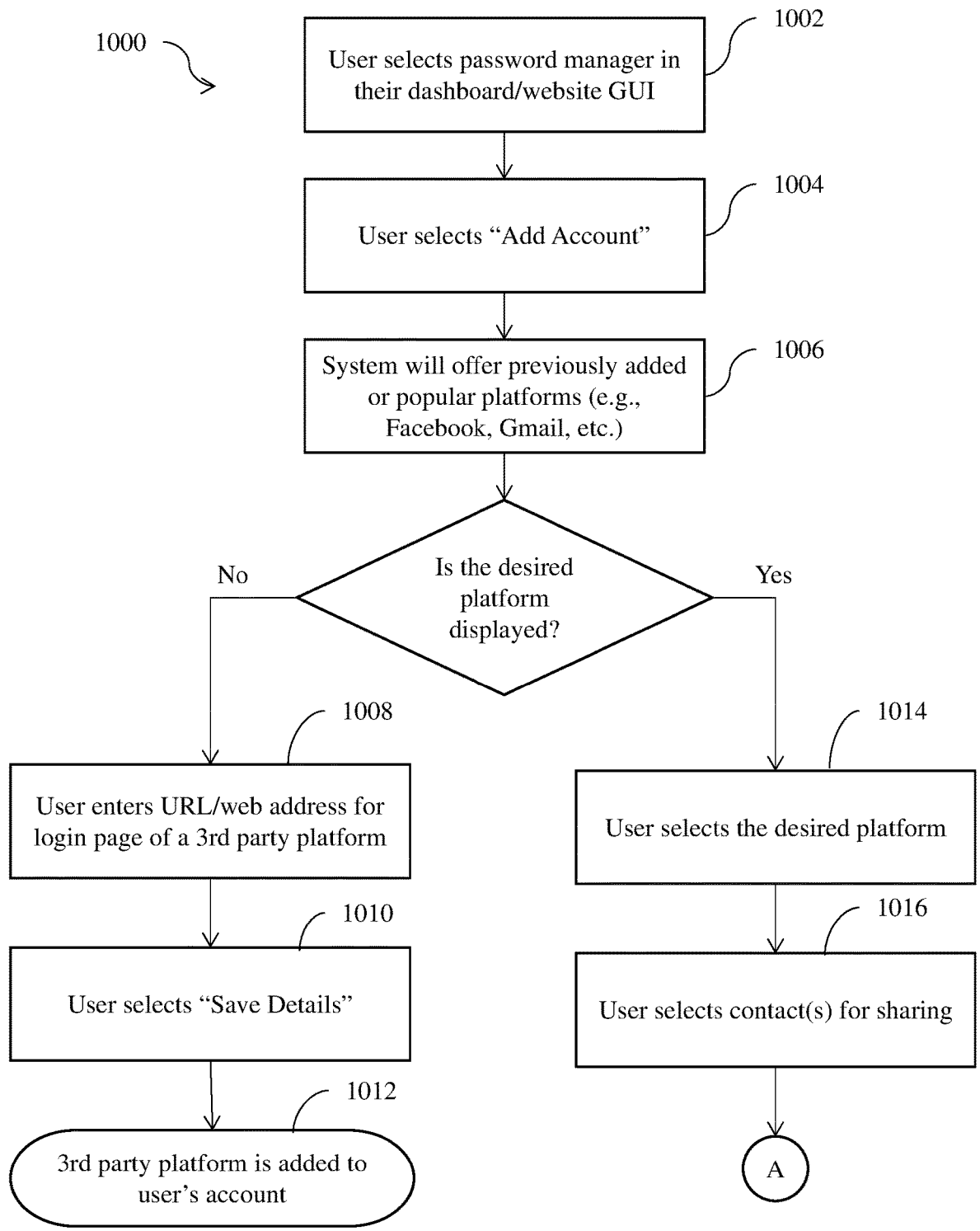
FIGS. 10A and 10B show a user (subscriber)-side password manager operation according to an embodiment.
Figure 10B:
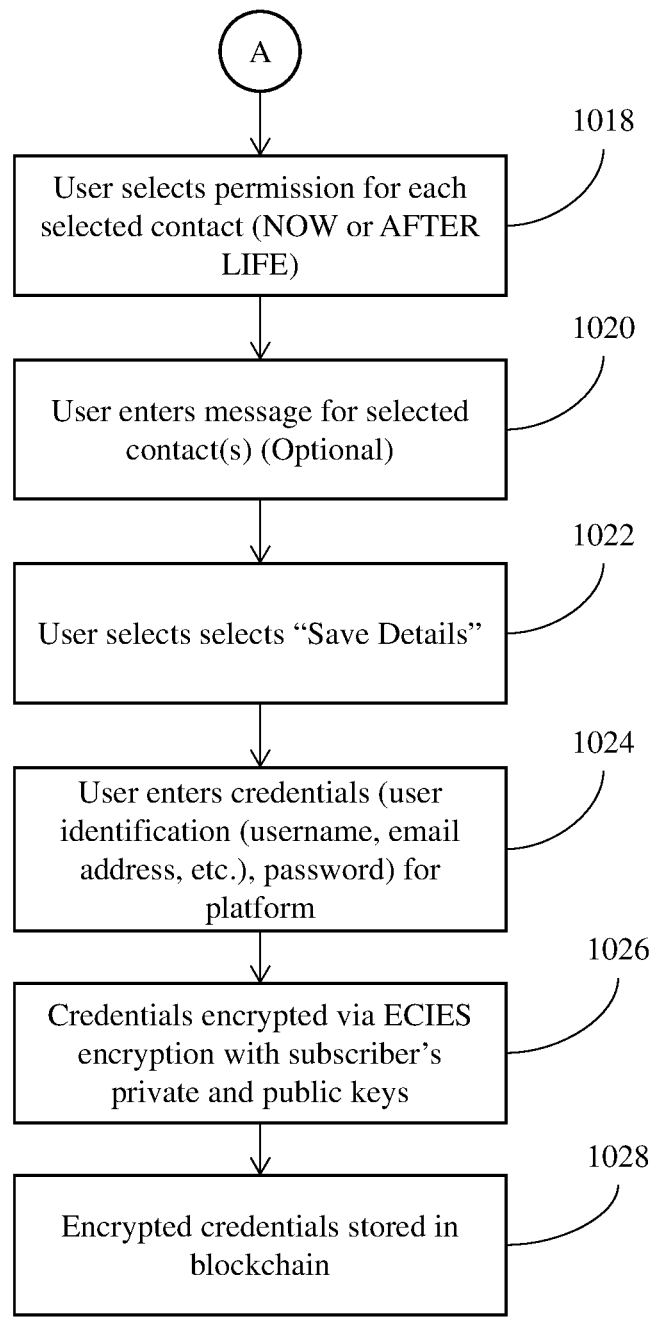

FIGS. 10A and 10B show a user (subscriber)-side operation 1000, according to an embodiment.

The user may select the user-side password manager option in their system dashboard/website GUI (block 1002). The may select an "Add Account" option (block 1004). The system may offer previously added or popular platforms (e.g., Facebook, Gmail, etc.) (block 1006).

If the platform desired by the user is not displayed, the user may enter the URL/web address for a login page of a third party platform (block 1008). The user may then select a "Save" option to add the third party platform to their account (block 1010), and the system will add the third party platform to the user's account (block 1012).

If the desired platform is displayed, the user may select the desired platform to be shared (block 1014). The user may then select trusted contact(s) linked to their account for sharing (block 1016).

The subscriber may select a permission type for each selected contact, for example, immediate ("NOW") or after a triggering event, such as death or incapacitation (AFTER LIFE) (block 1018). The user may also optionally enter a message for the selected contact(s) (block 1020), and select "Save Details" (block 1022).

The user may then enter the user identification and password for the selected platform (block 1024). The system may then encrypt the user's credentials, e.g., user identification and password, via ECIES encryption, using the subscriber's private and public key (block 1026) and store the encrypted credentials on the blockchain (block 1028).

The user credentials for the selected platform may then be shared with the selected contact(s) at the time set out by the user-selected permissions for that contact, e.g., "NOW" or "AFTER LIFE".

Figure 11:
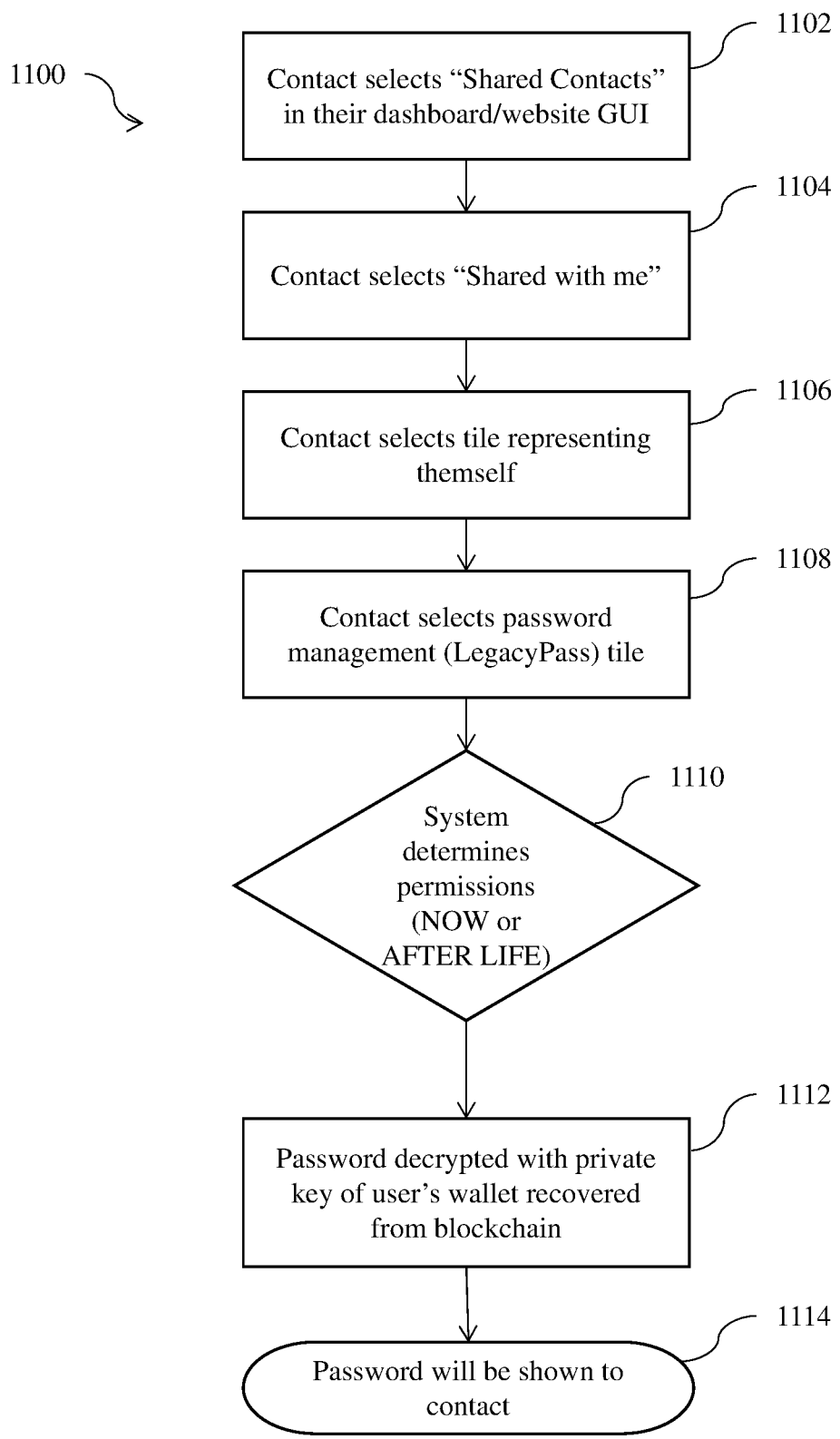
FIG. 11 show a trusted contact-side password manager operation according to an embodiment.

FIG. 11 show a trusted contact-side password manager operation 1100, according to an embodiment.

A contact may select "Shared Contacts" in their dashboard/website GUI (block 1102), and select "Shared with me" (block 1104), and then select a tile representing themselves (block 1106).

The user may then select a contact-side password manager tile, or option (block 1108). The system may determine whether the permissions are available to the contact at that time, i.e., "NOW" or "AFTER LIFE" (block 1110). If the permission is valid, the system may decrypt the user credentials for the particular platform using the user's public key and private key recovered from the user's wallet in the blockchain (block 1112), and then show the user's credentials to the contact (block 1114).

The system described provides multiple technological and efficiency aspects over existing solutions. For example, the secure storage of the user/testator's private key for necessary transactions to fulfill the terms of the will after the user's death or incapacitation. In addition, the system uses a machine learning model to accurately estimate fluctuating gas prices to support the efficient emergency transfer of assets from a user's wallet to an emergency backup wallet in the event of an attack or potentially compromised confidential information to avoid over- or under-charging the user for the gas price of the transaction is advantageous taking into account the time sensitive nature of, and potential stress caused by, such a situation. In addition, the password manager enables trusted contacts access to the user's credentials for particular passwords in case of a triggering event.

Various aspects of the embodiments of the system described above could also be used for one-stop storage for important documents, a secure storage platform, as well as a financial management platform with features like asset aggregation and net worth reporting. The analytics provided by the system platform for blockchain assets such as NFTs and cryptocurrencies may also be helpful for investors.

The foregoing method descriptions and diagrams/figures are provided merely as illustrative examples and are not intended to require or imply that the operations of various aspects must be performed in the order presented. As will be appreciated by one of skill in the art, the order of operations in the aspects described herein may be performed in any order. Words such as "thereafter," "then," "next," etc. are not intended to limit the order of the operations; such words are used to guide the reader through the description of the methods and systems described herein. Further, any reference to claim elements in the singular, for example, using the articles "a," "an," or "the" is not to be construed as limiting the element to the singular.

Various illustrative logical blocks, modules, components, circuits, and algorithm operations described in connection with the aspects described herein may be implemented as electronic hardware, computer software, or combinations of both. To clearly illustrate this interchangeability of hardware and software, various illustrative components, blocks, modules, circuits, operations, etc. have been described herein generally in terms of their functionality. Whether such functionality is implemented as hardware or software depends upon the particular application and design constraints imposed on the overall system. One of skill in the art may implement the described functionality in varying ways for each particular application, but such implementation decisions should not be interpreted as causing a departure from the scope of the claims.

The hardware used to implement various illustrative logics, logical blocks, modules, components, circuits, etc. described in connection with the aspects described herein may be implemented or performed with a general purpose processor, a digital signal processor ("DSP"), an application specific integrated circuit ("ASIC"), a field programmable gate array ("FPGA") or other programmable logic device, discrete gate logic, transistor logic, discrete hardware components, or any combination thereof designed to perform the functions described herein. A general-purpose processor may be a microprocessor, a controller, a microcontroller, a state machine, etc. A processor may also be implemented as a combination of receiver smart objects, e.g., a combination of a DSP and a microprocessor, a plurality of microprocessors, one or more microprocessors in conjunction with a DSP core, or any other such like configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions (or code) on a non-transitory computer-readable storage medium or a non-transitory processor-readable storage medium. The operations of a method or algorithm disclosed herein may be embodied in a processor-executable software module or as processor-executable instructions, both of which may reside on a non-transitory computer-readable or processor-readable storage medium. Non-transitory computer-readable or processor-readable storage media may be any storage media that may be accessed by a computer or a processor (e.g., RAM, flash, etc.). By way of example but not limitation, such non-transitory computer-readable or processor-readable storage media may include RAM, ROM, EEPROM, NAND FLASH, NOR FLASH, M-RAM, P-RAM, R-RAM, CD-ROM, DVD, magnetic disk storage, magnetic storage smart objects, or any other medium that may be used to store program code in the form of instructions or data structures and that may be accessed by a computer. Disk as used herein may refer to magnetic or non-magnetic storage operable to store instructions or code. Disc refers to any optical disc operable to store instructions or code. Combinations of any of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

The invention claimed is:

1. A system comprising:
a system controller;
a database that stores data associated with cryptocurrency wallets and a system gas tank;
a transaction module that manages cryptocurrency transactions and payment of gas fees;
a gas fee calculation module including a machine learning model trained on historical gas fee data;
a non-transitory memory containing instructions when executed by the system controller causes the system controller to perform the steps of:
in response to a user request, generating a backup wallet in the system;
calculating, by the gas fee calculation module, a gas fee for a transfer of assets from a user wallet to the backup wallet;
initiating, by the network interface, a connection with a financial institution associated with the user and retrieving funds corresponding to the gas fee from a user account associated with the financial institution,
paying, by the transaction module, the gas fee for the transfer of assets from the system gas tank, and
completing, by the transaction module, the transfer of assets.

2. The system of claim 1, a non-transitory memory containing instructions when executed by the system controller causes the system controller to perform the steps of:
connecting the user wallet in the system;
receiving a user private key;
associating the user private key with a user identifier; and storing the private key in a blockchain associated with a user wallet.

\* \* \* \* \*